United States Patent

[11] 3,546,360

[72] Inventor Kenneth Jeffrey Bailey
    Handforth, England
[21] Appl. No. 656,226
[22] Filed July 26, 1967
[45] Patented Dec. 8, 1970
[73] Assignee North Western Specialities Limited
    Stalybridge, Cheshire, England

[54] ELECTRICAL WIRING SYSTEM PRINCIPALLY FOR BUILDINGS
6 Claims, 10 Drawing Figs.

[52] U.S. Cl. .................................................. 174/48,
                                                         339/23
[51] Int. Cl. ..................................................... H02g 3/04
[50] Field of Search .......................................... 174/48, 49,
          51, 68(C), 70.3, 72(C), 95, 97, 101; 339/22, 23

[56] References Cited
UNITED STATES PATENTS
3,464,052  8/1969  Hukin ........................... 339/22

| | | | |
|---|---|---|---|
| 2,132,400 | 10/1938 | Curren ........................... | 339/23X |
| 2,313,960 | 3/1943 | O'Brien ........................... | 339/23 |
| 2,441,698 | 5/1948 | Gerspacher et al. ........... | 174/97X |

FOREIGN PATENTS

| 577,049 | 5/1946 | Great Britain ................ | 339/23 |
|---|---|---|---|
| 1,305,181 | 8/1962 | France ........................... | 174/97 |
| 1,470,097 | 1/1967 | France ........................... | 174/48 |

Primary Examiner—L. H. Myers
Assistant Examiner—D. A. Tone
Attorney—Emory L. Groff and Emory L. Groff, Jr.

ABSTRACT: An electric wiring system including casing sections of an extruded plastic material for fixing to a wall and constructed to hold electric wiring, with means for connecting casing sections together with the wiring fully protected, and take off points mounted on the casing sections. The system provides an arrangement which can be prefabricated to standard dimensions for easy fixing in a building, the wiring at section ends being connected together and shrouded in junction pieces.

INVENTOR
KENNETH J. BAILEY

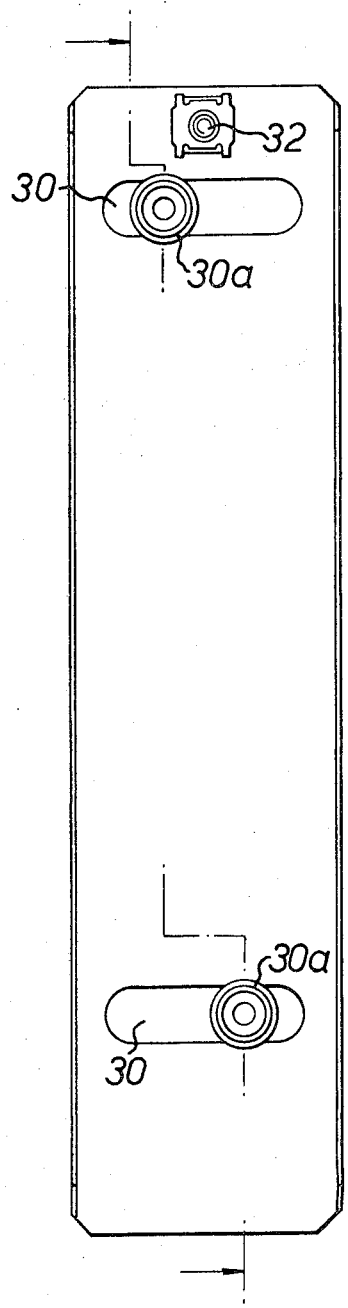
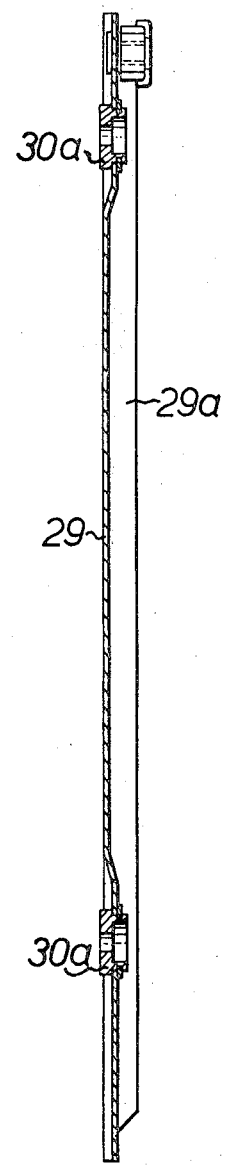

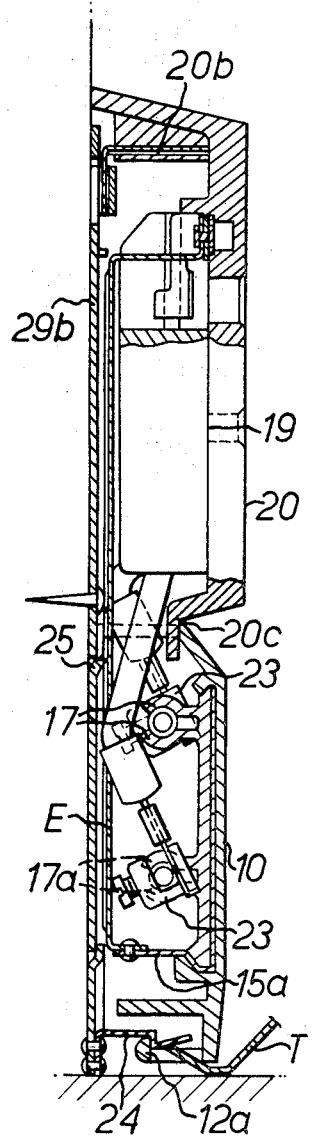
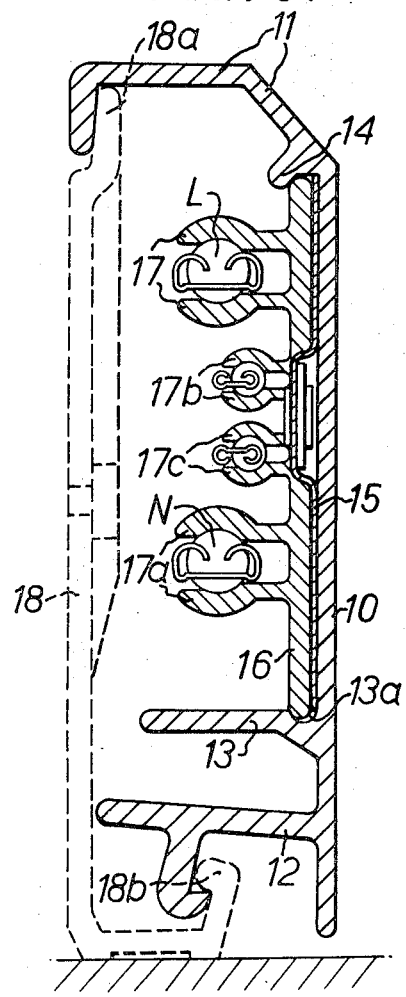
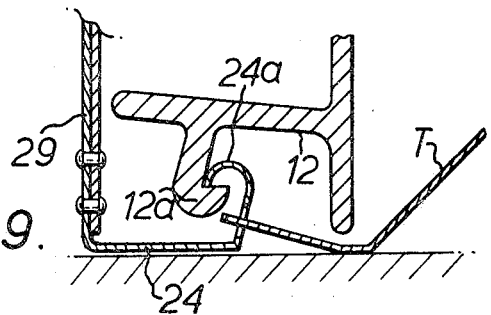

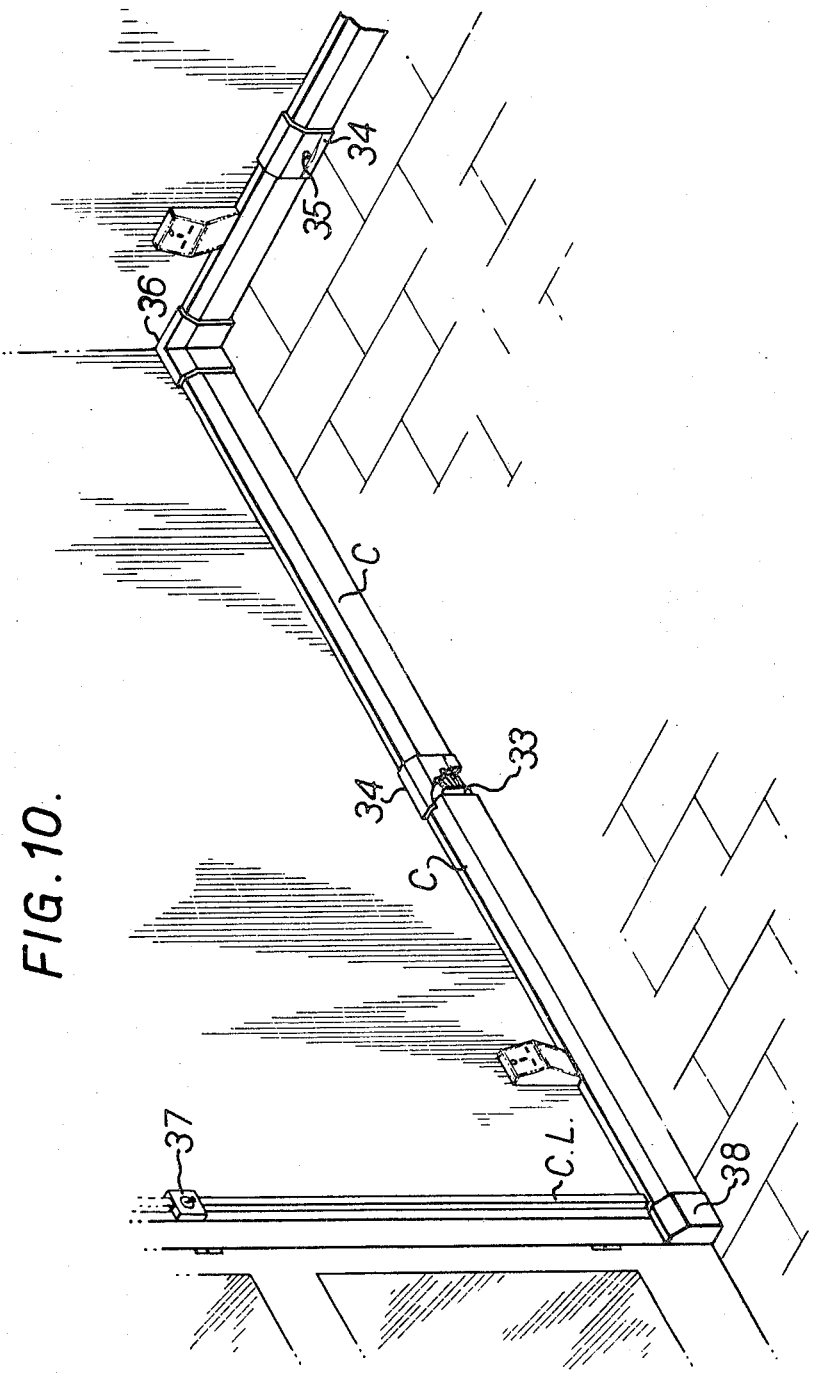

ELECTRICAL WIRING SYSTEM PRINCIPALLY FOR BUILDINGS

This invention concerns wiring systems and is intended primarily for the electrical wiring of buildings constructed from standard components thus having uniformity of layout with a number of rooms and the like of a standard size.

An important object of the invention is to provide an arrangement and system which can be factory manufactured at least to a great extent enabling the electrical wiring cables in a building to be fitted with a minimum of labour especially in regard to the running and fixing of the cables, with component parts preassembled so as to require mainly only the fixing of standard prewired parts to the building structure. Another object of the invention is to provide an assembly of parts which can be supplied as a package each package containing necessary parts for the fitting of same into a room or the like, the parts already housing cables so that cable ends of parts can be coupled up thus avoiding the need for embedding cables into walls or the like.

Another object of the invention is to provide an electric wiring system consisting of prefabricated casing sections which house the wiring and which can be cut to desired length easily, so that packages can be sent to a building and the wiring of rooms effected easily and by semiskilled labour. The system according to the invention provides casings as wall skirtings, these housing the wiring and may include a complete system including casings for power cables, also lighting cables, take off points, switches, light fitting sockets or ceiling roses or lighting points. Casings for lighting need be only plain channel section casings.

In order that a clear understanding of the invention may be obtained, reference will not be made to the accompanying drawings, illustrating preferred embodiments of the invention.

In the drawings:

FIG. 5 is a front view of a wall plate for fixing a takeoff socket to a wall;

FIG. 6 is a sectional side view of the plate shown in FIG. 5;

FIG. 7 is a sectional side view of a modification of the arrangement for fixing a casing to a wall;

FIG. 8 is a side view of another form of casing;

FIG. 9 is an alternative arrangement for fixing a casing to a wall; and

FIG. 10 shows the essentials of the fitting of a typical wiring system.

Figure 1:
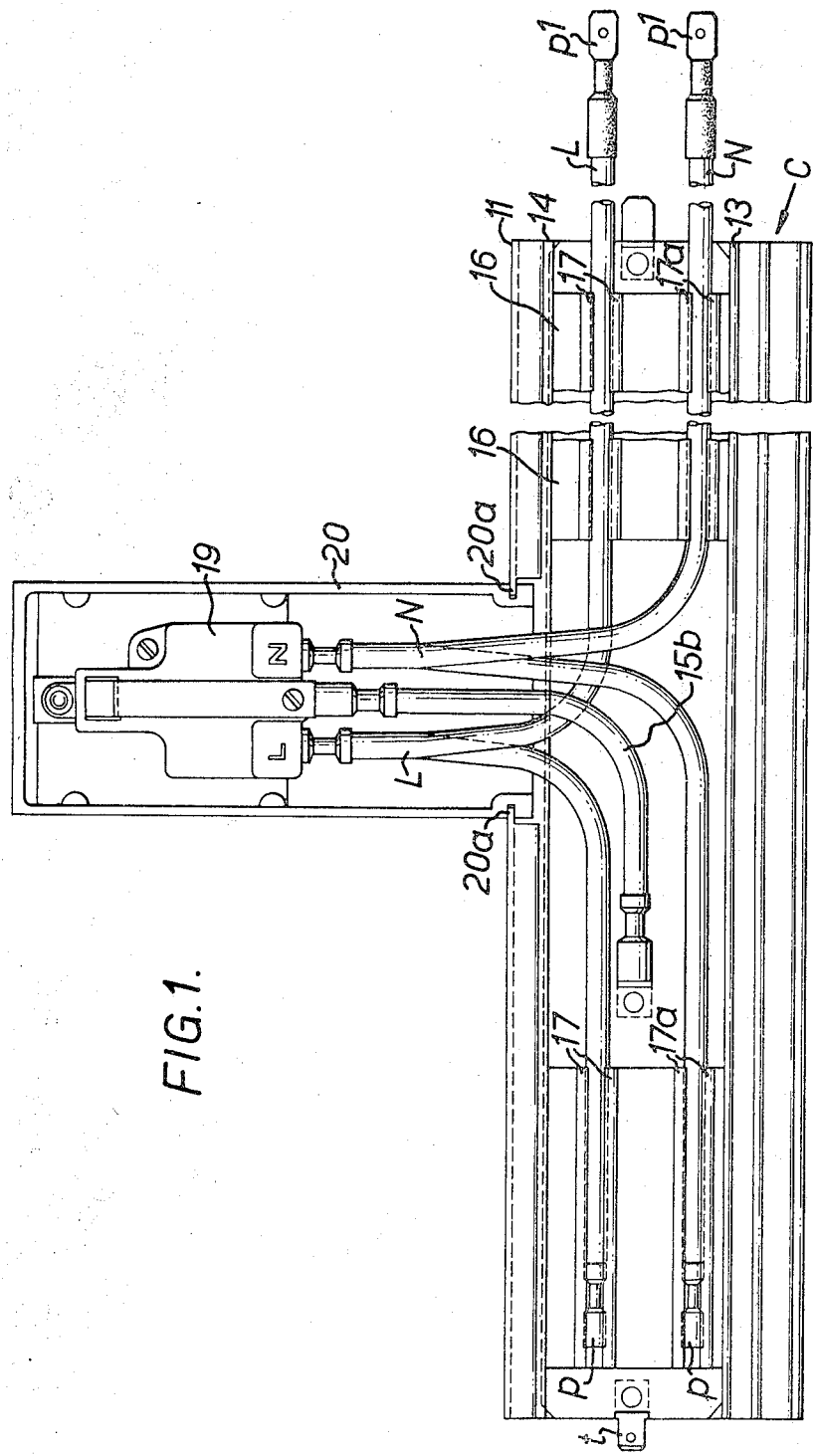
FIG. 1 is a rear view of one form of casing or trunking with a socket takeoff point.
Figure 2:
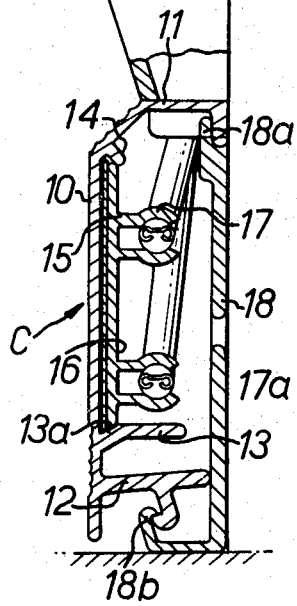
FIG. 2 is a sectional side view, FIG. 1.

As shown in FIGS. 1 and 2 of the drawings, the casing or trunking C is an extrusion of a synthetic plastics material of appropriate rigidity and consisting of a front wall 10, top wall 11 and bottom wall 12, the front wall extending below the bottom wall 12. There also is an internal partition wall 13 from the front wall 10, this defining a space between itself and the bottom wall 12. A rib 14 runs along the inside of the front wall and in the space between this rib 14 and the partition 13 is a metal strip 15, the partition 13 having a small depression 13a therealong at its junction with the wall 10.

The metal strip 15 is held in place by spaced-apart platelike parts 16 of synthetic plastics material these springing into the grooves formed by the rib 14 and the depression 13a. The platelike parts 16 are spaced apart along the casing and they have upper and lower pairs of ribs 17, 17a with arcuate heads, these forming tunnels or clips which are sufficiently resilient to permit an insulated cable, these being referenced L and N, to be pushed in so that these cables run along and are supported in the interior of the casing C. The plates 16 are of suitable width to give support to the cables and also hold the strip 15 in position. Instead of spaced plates, one single plate could extend the length of the casing.

The strip 15 provides an earth for the electric system as well as protection for the cables L and N.

The casing shown is for fixing to a wall as a skirting and it can be fixed in any appropriate manner. As shown, anchor plates 18 of synthetic plastic material or metal are used, these being fixed to the wall by screws or other suitable means at intervals along the wall at floor level. Each anchor plate has an upper lip 18a and a bottom hook 18b. After the anchor plates have been fixed, a length of casing is secured by addressing it to the said plates with a downward and inward movement, so that the casing clips on by a snap action. The casing could be fixed alternatively or additionally to the anchor plates by screw means. The fixing could be such that a special tool is necessary to remove the casing and one such arrangement is described later.

Instead of anchor plates, a single strip could be secured along the wall and the casing engage this single strip.

Ends of cables at adjacent ends of casings along a wall are joined, and this can be done conveniently by plug and socket connections. As shown in FIG. 1, the one end (left hand in the drawing) is formed to abut the adjacent end of another casing or to unite therewith by means of a special junction casing piece as later described. The cable ends at this casing end are within their casing and each has a connector termination $p$. The plate end has a tag $t$. At the other end, the cables extend beyond the casing and have connector terminations $p'$, so that cables from one casing will connect to those of the adjacent casing by way of a plug and socket coupling. These junctions may be suitable electrically protected by being within the tunnels or clips and/or by insulated sleeves.

FIGS. 1 and 2 also show a takeoff socket. Such socket could be fixed in position on the casing during fabrication of the casing but it also can be arranged for fixing on site. As shown a conventional three-point socket 19 is secured in a housing 20, which housing is attached to the casing by cutting away the top wall 11, the housing bottom having grooves 20a, 20a, so that a sliding fit is obtained. The cables L and N are connected by plug and socket means or by terminals and screws to the points L and N of the socket 19. The metal strip 15 is connected to the switch by jumper wire 15b. A takeoff point housing could be formed with a lower part to which adjacent casing ends engage by slot and tongue or like connection, i.e. the housing forms a junction between adjacent casing lengths.

Figure 3:
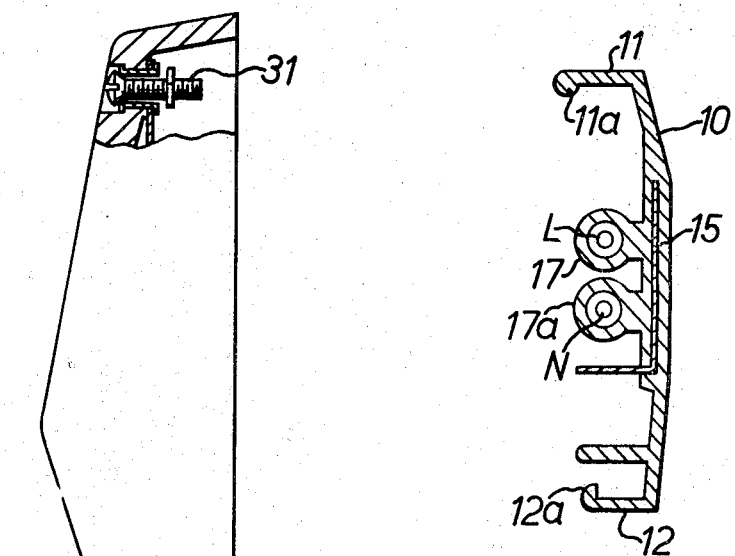
FIG. 3 is a sectional side view of a modification.

A modification is shown in FIG. 3. In this, the plate 15 is moulded in the front wall 10 of the casing C and the wires are embedded in tunnel heads of single ribs 17, 17a. Pairs of ribs for a clip in action could be used in this embodiment, as could moulded in cables in the construction shown in FIGS. 1 and 2. The modification of FIG. 3 also shows a different arrangement for the securing of the casing to a wall. The top wall 11 has a bead 11a and the bottom wall 12 a bead 12a. The casing clips onto a plate or onto hangers fixed to the wall, by a snap action.

A preferred form of wall plate for fixing a takeoff point is shown in FIGS. 5 and 6. This consists of a plate 29 arranged so that it can be fixed to the wall e.g. by screw means, the plate being formed with bent over side parts 29a. As shown the housing has horizontal slots 30, 30 in each of which a collar 30a is mounted so as to slide along its slot. The plate is fixed to the wall by screws one passing through each collar, the arrangement allowing for inaccuracies in mounting and for any sideways movement of the casing and housing. The housing is secured by a bolt 31 (FIG. 2) engaging a nut 32 anchored in a hole through the plate.

Figure 4:
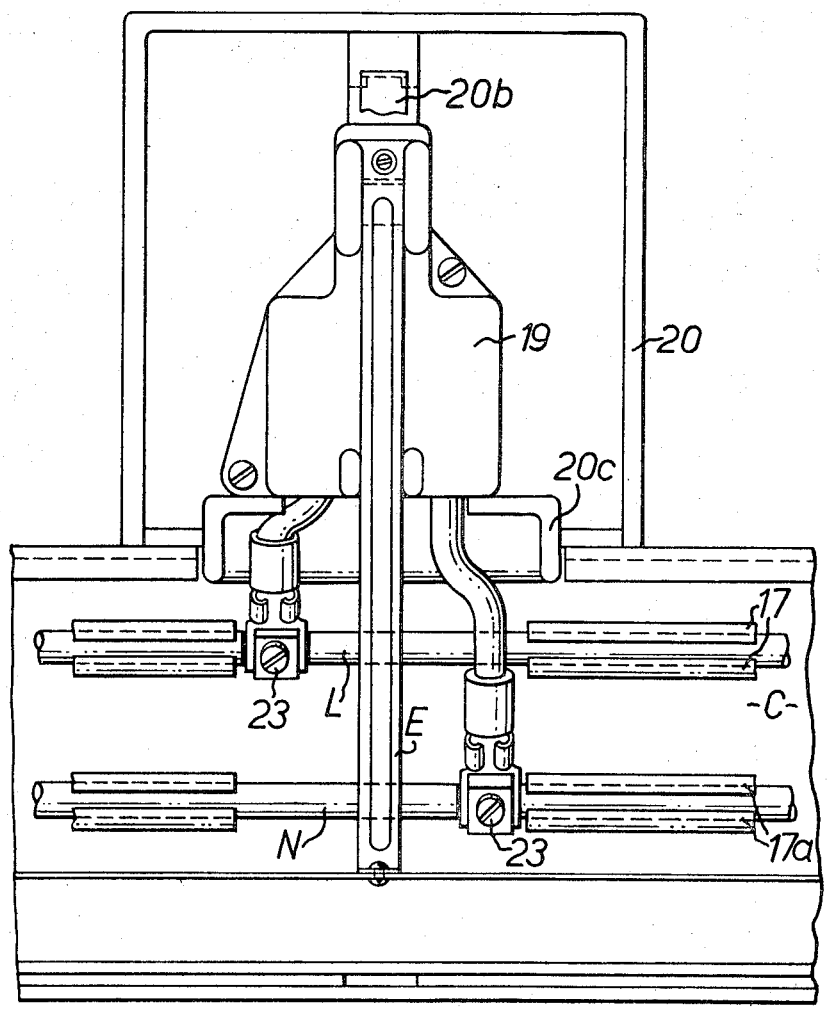
FIG. 4 is a rear view of a modified form of take off socket.

In the arrangement shown in FIGS. 4 and 7, the casing C is cut out at the location in which a takeoff point is to be fitted and the housing 20 has a lip 20c, integral therewith. The housing could have a spring hook or clip 20b to engage in a socket in a support wall plate 29b (FIG. 7).

FIGS. 4 and 7 also show an arrangement in which the connections to the cables are by way of clamp on terminals 23. The earth socket connection is by way of an earth strip E connected to an extension from the plate 15.

FIG. 7 also shows an arrangement in which the casing locks to the back plate and can be released only by using a tool. In this arrangement, the wall plate has a bottom locking clip 24 and an upper pressed part 25 forming a slot. The catch or bead 12a of the bottom wall 12 engages behind a lip of the clip 24 and the catch or bead 11a engages the part 25. The bottom wall 12 is slotted so that a tool T can be inserted therethrough to lift up the end of the clip to obtain release of the casing C.

It will be noted in FIGS. 1, 2 and 3 that the casing C has a space between the walls 12 and 13. This runs along the casing and can receive other wiring such as lighting wiring, radio or television feeders, intercommunication system wiring and the like. Such other wiring is protected from the mains wiring by the wall 13. Additionally, as shown in FIG. 7, the earth strip can extend into the casing as at 15a for additional electrical protection.

This could be connected to a metal plate running completely along the back of the casing so that the mains wiring is fully shrouded.

In the arrangement shown in FIG. 8, additional ribs 17b, 17c extend from the plates 16. These additional clips carry low current carrying cables e.g. for lighting circuits.

In the construction of FIG. 9, the casing C is as shown in FIGS. 1 and 2. Each locking clip 24 has a crooklike head 24a to engage the bead 12a of the casing. The clip has a slot into which the end of a tool T can be inserted to lever the clip up to release the casing. Such forms of locking can be provided at intervals along the wall, e.g. two for each length of casing.

FIG. 10 shows details of a complete wiring system. Casing lengths C are fixed to the walls W as skirting. Where ends of lengths are adjacent and in line a junction unit is used, this comprising a wall plate 33 which is secured to the wall, and a cover 34 which screws to a nut mounted on the wall plate 33, by a bolt 35. Alternatively, the cover can clip on, so as to be removable only by a special tool as described with reference to the casing. One of the covers is shown broken away in the drawing. The adjacent cable ends can be connected by plugs and sockets as above described either by making those from one casing sufficiently long to reach into the other casing or by short lengths of coupling cables. The earth plate conveniently is coupled by a short length of wire or jumper coupling.

At the corner, a junction unit referenced generally 36 is used. This is similar to the in-line unit but comprising a right angle wall plate and cover. The corner junction unit shown is for an inside corner. For an outside corner an outside corner (not shown) of reversed angularity is used.

The casings C fit slidingly into the coupling units which allows for tolerences in cutting the casing lengths and also permits movement for example due to expansion or contraction.

Where the casings carry wiring for electric lighting, the top wall may be cut away so that a casing such as C.L. can be used to enshroud the lighting wiring, a switch such as 37 can be fitted. Alternatively a casing may extend to the floor and cut away so that the casing enters therein. Casings C.L. can be taken up walls over lintels and across ceilings. In the latter case, the ceiling casings may be formed with a central upstanding rib which is shaped, e.g. of barbed cross section, so as to be pressed into and retained between gaps in ceilings built up from slats or slabs.

Where the wiring is to cross a door threshold the wires can pass through casings which pass from one side of the threshold to the other instead of over the top of the door. Further, the cables can be taken from one side of a door to the other by fitting units a part of one of which is shown at 38, these units being fixed in a space cut out at the bottom of the door upright. A similar form of casing system is fitted to the other side of the wall and in the adjacent room. Units 38 also could be constructed so that ends of casings C.L. fit thereinto.

With the invention herein it is possible to fix wiring in a building using lengths of casing cut to size. In fact, the wiring for rooms can be prefabricated and supplied as a package for each room. This is of particular advantage with present-day buildings in which a number of rooms are built to standard dimensions.

I claim:

1. An electric wiring system comprising a casing consisting of a length of extruded insulating material said casing having a front wall, top wall and bottom wall, said walls forming a substantially channellike structure, means at the inner surface of the front wall retaining cable supporting plate means, said cable supporting plate means having rib members projecting therefrom, electric cable-receiving clip heads on said rib members to hold cables to run along the said front wall and spaced therefrom, anchor plates for fixing to structural parts at spaced intervals, cooperating means at the ends of the top and bottom walls and tops and bottoms of said anchor plates for clip-on engagement of said casing on anchor plates, and electric connector means at the ends of said cables for the connection of adjacent ends of adjacent colinear casings supported by said anchor plates.

2. An electric wiring system as claimed in claim 1, wherein the said inner surface has grooves therealong, said plate means springing thereinto.

3. An electric wiring system as claimed in claim 2, wherein a metal earth strip is anchored between said plate means and the inner front wall surface.

4. An electric wiring system as claimed in claim 2, wherein a partition runs along the said inner wall to define a space to receive additional wires or cables.

5. An electric wiring system as claimed in claim 1 wherein takeoff points are mounted on the top wall of said casings, each said point comprising a housing with means for fixing same to a structure, said housing containing an electric point to the terminal connections of which the cables in the casing are electrically connected.

6. An electric wiring system as claimed in claim 1 comprising casing members for fixing along a wall as skirting, takeoff points comprising housings mounted on the top walls of the casings, connection units joining adjacent ends of colinear casings, uprights and horizontals of channel section for retaining cables therein against structural parts, switches and lighting points mounted on said uprights and horizontals, said casings uprights and horizontals having electric cables with connection members at their ends for connection on a site, said cables including power supply and low current supply cables.